United States Patent Office 3,162,607
Patented Dec. 22, 1964

3,162,607
PRODUCTION OF POROUS REFRACTORY
OXIDE MATERIALS
Bernard Whiting Burbidge and Peter Thomas White, both of Sunbury-on-Thames, England, assignors to The British Petroleum Company Limited, London, England, a joint-stock corporation of Great Britain
No Drawing. Filed Mar. 21, 1962, Ser. No. 181,470
Claims priority, application Great Britain, Mar. 23, 1961, 10,604/61
9 Claims. (Cl. 252—477)

This invention relates to the preparation of porous refractory oxide materials, suitable for catalyst supports.

Refractory oxides, particularly alumina, silica or mixtures of silica and alumina are well known as catalyst supports. When used for such purposes, it has been found that their physical characteristics, particularly their porosity, affect the degree of contact and rate of contact between them and the materials being treated and in many processes, particularly those in which the feedstocks being treated contain relatively large molecules and/or processes where the rate of reaction is limited by the rate of contact, a material of high porosity is desirable. The porosity will also affect the density of the material and whatever the treatment, it has also been found generally desirable to have materials of low density so that the weight of material used is reduced. This porosity should, however, be such that the pores intercommunicate with one another, and the present invention is concerned with a process for preparing catalyst supports which gives supports having an interlacing network of pores.

According to the present invention a process for preparing a porous refractory oxide catalyst support comprises incorporating water-insoluble organic fibres into the support during its preparation and subsequently removing the fibres before use.

The refractory oxide may be an oxide of an element from Groups II, III and IV of the Periodic Table but the process is particularly applicable to refractory oxides which contain more than 50% wt. of alumina, silica, or mixtures of alumina and silica. Supports containing more than 50% wt. of alumina are particularly preferred. Any convenient method of preparation may be used, for example precipitation from solutions of salts followed by filtering and drying, hydrolysis of alcoholates or metals, followed by filtering, or drying or wet mixing or milling followed by drying. The preparation will normally include one or more steps for forming the support into a convenient physical form, for example into granules, pellets or extrudates. Calcination will normally be the final step in the preparation. Either synthetically prepared or naturally occurring supports may be used. The fibres may be incorporated in the support at any suitable stage of the preparation and a convenient method is to add them to a slurry of the support prior to drying.

The term "fibres" as used in this specification has its normal connotation, viz., particles having a ratio of length to width of at least 3. The fibres should be inert to the other constituents used or formed in the preparation and should clearly be readily removable by methods which do not damage the refractory oxide materials. One such method is extraction with a suitable solvent, but since calcination is a usual final step in the preparation it is particularly preferred to use fibres which can be removed during the calcination. For this reason the fibres are preferably organic fibres which are removable by combustion at calcination temperatures of 300–1200° C. Preferred normal calcination temperatures are 400–600° C. Suitable combustible organic fibres are cellulose fibres and these may be either natural cellulose fibres, such as cotton, or artificial cellulose fibres, for example those produced by the viscose or acetate process.

The size and shape of the pores produced will be proportional to the size and shape of the fibres used. The pores of refractory oxide materials used as catalyst supports are frequently classified by size into macropores and micropores, the volume of the former being determined by a mercury porosimeter, and the volume of the latter being determined by low temperature nitrogen adsorption using the BET method. The dividing line between macropores and micropores is normally 0.03 micron diameter. Depending on the size of the fibres used, either the macropore or micropore volume may be altered, but in general it is the macropore volume which will be affected. It has been found that the size of the pores in the final catalyst support is proportional to the size of the fibres used but the pores are smaller than the fibres due to shrinkage of the refractory oxide during drying and calcination. For most purposes macropores of the order of 0.3 to 50 microns diameter are desirable and these may, in general, be produced by the addition of fibres 10 to 100 microns diameter. The length of the fibres is desirably less than the minimum dimension of the finished catalyst support particles and they may thus be conveniently from ¼ to 1/250 of an inch (6.3 to 0.1 millimeters). The quantity of fibres used, taken in conjunction with the size of the fibres, should strike a balance between the desirability of increasing the porosity and the undesirability of reducing the physical strength of the catalyst support. Preferably the amount added is from 2 to 30% wt. by weight of the final catalyst support.

Catalytic material may be added to the catalyst support at any convenient point during or after the preparation of the support and this includes adding catalytic material before or simultaneously with the addition of the fibres. The invention thus includes the preparation of catalysts as well as catalyst supports. The catalytic material added will depend on the use for which the catalyst is intended, but a preferred use is for the hydrocatalytic treatment of hydrocarbons or mixtures of hydrocarbons, particularly petroleum hydrocarbons or mixtures thereof. In such hydrocatalytic treatments the catalyst material will normally be one or more elements or compounds of elements having hydrogenating/dehydrogenating activity selected from Groups VIa and VIII of the Periodic Table, for example chromium, molybdenum, tungsten, the iron group metals and the platinum group metals. The amount of these materials may be from 0.1 to 25% wt. (expressed as the element) by eight of total catalyst. A particularly preferred catalyst comprises the oxides of cobalt and molybdenum (as such or in combined form or both) on alumina, preferably from 1–10% wt. of cobalt oxide (expressed as CoO) and from 5 to 40% wt. of molybdenum oxide (expressed as $MoO_3$) by weight of total catalyst.

The catalysts are particularly suitable for use in processes where the feedstocks being treated contain relatively large molecules and/or processes where the rate of reaction is limited by the rate of contact. Thus the catalysts may particularly be used for the treatment of petroleum feedstocks in which at least a portion and preferably at least 50% vol., of the feedstock is in the liquid phase. It could be used, for example, for a predominantly liquid phase gasoline treatment process such as low temperature selective hydrogenation, but it is particularly suitable for the hydrocatalytic treatment of feedstocks boiling in the gas oil boiling range and above, including atmospheric and vacuum residues, that is feedstocks boiling above 150° C., and preferably above 250° C. One example of a suitable process is the hydrocatalytic desulfurization of crude oils and petroleum fractions boiling above 350° C. (including waxy distillate fractions and atmospheric and vacuum residues).

The process conditions for the hydrocatalytic desulfurization may be

Temperature, °F. ---- 550–900, preferably 600–800.
Pressure, p.s.i.g. ------ 15–3000, preferably 100–1500.
Space velocity, v./v./-
  hr. ------------- 0.5–20, preferably 1–10.
Gas rate (once through
  s.c.f. of $H_2$/b. or re-
  cycle) ---------- 50–10,000, preferably 1000–4000.

The process is preferably operated with a fixed bed of catalyst, since one of the advantages of the catalysts of the present invention is their lower rate of decline of activity as compared with conventional catalysts.

The invention is illustrated by the following examples.

EXAMPLE 1

An alumina hydrogel was prepared by precipitation from an aqueous solution of aluminium nitrate ammonia solution. The gel was thoroughly washed with deionized water. A portion of the gel (representing 35 g. dry $Al_2O_3$) was slurried with 1-litre deionized water and 1 g. cellulose fibres (average length ¼″) was added. The mixture was stirred thoroughly and filtered. The filter cake was dried at 110° C., calcined at 400° C. for two hours and at 550° C. for a further two hours. The material was crushed and sieved to give a sample of 5–12 mesh BSS particle size, designated Product A.

A further sample of the hydrogel (representing 35 g. dry $Al_2O_3$) was slurried with 1-litre deionized water and 10 g. cellulose fibres (average size: 120 microns long, 23 microns diameter) were added. The slurry was stirred, filtered, dried, calcined, crushed and sieved as above to give a sample (Product B).

The macropore structures of the aluminas prepared in the two experiments were examined on a mercury porosimeter. The method of examination consists, essentially, of injecting mercury under pressure into an evacuated sample of the material under examination. The pore volume is measured by the amount of mercury injected, while the pore radius is related to the pressure applied. Further information on the method can be found in Industrial and Engineering Chemistry, Analytical Edition, December 1945, at page 782.

Products A and B are compared with a conventional alumina in Table 1. It can be seen that there is a considerable increase in macropore volume in the materials prepared according to the example. Further, the pore size range has been extended from a maximum of 1.43 to 16 microns radius.

Table 1

| Pore radius (microns) | Volume (ml./g.) | | |
|---|---|---|---|
| | Conventional Alumina | Product A | Product B |
| 16.0 (and greater) | | | 0.0024 |
| 9.5–16.0 | | 0.004 | 0.014 |
| 6.7–9.5 | | 0.002 | 0.010 |
| 5.2–6.7 | | 0.002 | 0.011 |
| 4.3–5.2 | | 0.002 | 0.015 |
| 3.6–4.3 | | 0.002 | 0.016 |
| 2.8–3.6 | | 0.002 | 0.031 |
| 1.43–2.8 | 0.002 | 0.004 | 0.107 |
| 0.80–1.43 | 0.002 | 0.004 | 0.069 |
| 0.34–0.80 | 0.003 | 0.006 | 0.049 |
| 0.18–0.34 | 0.002 | 0.007 | 0.026 |
| 0.12–0.18 | 0.001 | 0.003 | 0.015 |
| 0.09–0.12 | 0.001 | 0.004 | 0.013 |
| 0.045–0.09 | 0.002 | 0.019 | 0.070 |
| 0.029–0.045 | } 0.007 | { 0.026 | 0.099 |
| 0.023–0.029 | | 0.030 | 0.052 |
| 0.015–0.023 | 0.050 | 0.038 | 0.089 |
| Total | 0.070 | 0.155 | 0.688 |
| Piece density, g./ml | | 1.36 | 0.863 |

EXAMPLE 2

An alumina hydrogel was prepared by precipitation from an aqueous solution of 2200 g. of aluminium nitrate with ammonia solution. The gel was thoroughly washed with deionized water and, finally, was allowed to drain on a filter for 48 hours. When removed from the filter the gel had a volume of 4 litres. 131 g. ammonium molybdate (dissolved in 400 ml. deionized water) were added to the hydrogel. The mixture was stirred for 10 minutes and 83 g. cobalt nitrate dissolved in 100 ml. deionized water were added to the slurry. The slurry was stirred vigorously for 1 hour and divided into two equal parts. 45 g. cellulose fibres (average size: 120 microns long, 23 microns diameter) were added to one part while the other part was retained as a control sample. The two parts were stirred, filtered, extruded, dried at 105° C. and calcined for a total of seven hours according to the following schedule:

|  | ° C. |
|---|---|
| Initial temperature | 170 |
| After 2 hours | 320 |
| After 3½ hours | 420 |
| After 7 hours | 580 |

The catalysts were then broken into ⅛″–¼″ lengths and sieved on a 16 mesh BSS sieve to remove fines.

The physical properties of the two catalysts are compared in Table 2 together with their desulfurization activities.

Table 2

| | Control Sample | Modified Sample |
|---|---|---|
| Co, percent wt | 3.6 | 3.6 |
| Mo, percent wt | 13.8 | 13.8 |
| Piece density, g./ml | 1.24 | 1.0 |
| Crushing strength (% wt. retained on 6 mesh sieve) | 69 | 67 |
| Surface Area (BET), m.²/g | 287 | 286 |
| Micropore Volume (BET), m.¹/g | 0.28 | 0.28 |

| Macropore Volume Distribution | Volume (ml./g.) | Volume (ml./g.) |
|---|---|---|
| Pore Radius (microns): | | |
| 3.6 (and greater) | Nil | 0.0025 |
| 2.8–3.6 | Nil | 0.0071 |
| 1.43–2.8 | 0.0012 | 0.0662 |
| 0.80–1.43 | 0.0008 | 0.0662 |
| 0.34–0.80 | 0.0016 | 0.0326 |
| 0.18–0.34 | 0.0008 | 0.0051 |
| 0.12–0.18 | 0.0008 | 0.0112 |
| 0.09–0.12 | 0.0004 | 0.0036 |
| 0.045–0.09 | 0.0021 | 0.0148 |
| 0.023–0.045 | 0.0572 | 0.0463 |
| 0.015–0.023 | 0.0334 | 0.0275 |
| Desulfurization activity:[1] | | |
| At 650° F., percent | 34 | 34 |
| At 775° F., percent | 82.5 | 79 |
| Wt. of catalyst charged, g | 60 | 46 |

[1] The test conditions were:
  Feedstock: Wax distillate: 320°–566° C. ASTM boiling range 2.83% wt. sulfur.
  Pressure: 1,000 p.s.i.g.
  Space velocity: 1.5 v./v./hr.
  Gas rate ($H_2$): 1,000 SCF/B.

Particular features of the example are:
(1) The decrease of catalyst density without loss of catalyst strength obtained by incorporating the cellulose fibres.
(2) Equivalent volumes (75 ml.) of the two catalysts have identical activities although there is 24 percent weight less of the modified catalyst in the reactor. Since the cost of the cellulose fibres is considerably less than that of the alumina, and catalysts are normally valued on a weight basis, the modified catalyst represents a cost saving of about 20% on the catalyst, without any sacrifice of other properties. Alternatively if the reactors had been filled with equal weights of catalysts, the modified catalyst would have shown a greater activity.

(3) The catalysts have identical micropore volumes and surface areas but the modified catalyst has a large additional pore volume in pores of radius 0.36–3.6 microns.

(4) A comparison of the macropore volume distributions of Product B, Table 1 and Modified Sample, Table 2, shows that both materials exhibit a large pore volume in the pore size range 0.34–3.6 microns radius and this is attributed to the incorporation and subsequent removal of the cellulose fibres. It seems, therefore, that the size of the fibres used governs the size of the pores produced although the shrinkage of the alumina during calcination leads to pores of a smaller size than would be expected from the size of fibres employed.

EXAMPLE 3

An alumina hydrogel was prepared by dissolving aluminium nitrate $Al(NO_3)_3 \cdot 9H_2O$ in deionized water. 0.880 ammonia was added with vigorous stirring until the pH had risen to 8.5. The resulting slurry was stirred for six hours and left standing overnight. The alumina was filtered, reslurried with deionized water, stirred (pH adjusted to 8.5) and filtered again. The alumina was again slurried with deionized water, stirred for two hours and left standing for 60 hours. During this period the appearance changed from semi-translucent to a white creamy texture. The supernatant liquid was decanted off and an equivalent quantity of deionized water added. The mixture was stirred (pH adjusted to 8.5), filtered, reslurried with deionized water. The resulting gel was then filtered without suction over a period of 48 hours. The resulting alumina hydrogel (representing 700 g. of $Al_2O_3$) was aged at 70° C. for 16 hours after standing for 1 month at ambient temperature. 102 g. of cobalt nitrate

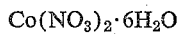

and 182 g. ammonium molybdate (82 percent $MoO_3$) were dissolved in the minimum quantity of deionized water and added to the hydrogel which was stirred for six hours, allowed to stand for three days, and further stirred before withdrawing samples for catalyst preparation.

A portion of the CoMo alumina hydrogel prepared as above representing 140 g. finished catalyst was stirred thoroughly whilst 40 g. of 60μ diameter viscose rayon fibres approximately 0.1 inch long were added. The slurry was filtered and the filter cake extruded through a 3/16 inch diameter nozzle. The extrudate was dried at 100° C., calcined for 1 hour at 300–350° C. and for a further 2 hours at 550° C. This catalyst was designated Catalyst A.

A further sample of the CoMo alumina hydrogel as prepared above representing 140 g. finished catalyst but with no fibres added and the filter cake was extruded through a 3/16 inch diameter nozzle. The extrudate was dried at 100° C. and then calcined for 2 hours at 500° C. This catalyst was designated Catalyst B.

The two catalysts were then used for the hydrocatalytic desulfurization of a 315° to 550° C. ASTM boiling range wax distillate containing 2.47% wt. of sulfur. The process conditions used were

| | |
|---|---|
| Reactor pressure | 350 p.s.i.g. |
| Reactor temperature | 780° F. |
| Liquid space velocity | 2 v./v./hr. |
| Once through gas rate | 7.50 s.c.f./b. |
| Make up gas | Hydrogen. |
| Direction of flow | Upwards. |

Runs of 60 hours' duration were carried out using each catalyst. The desulfurization obtained with Catalyst A was

| Hours on Stream | 25 | 33 | 41 | 49 | 57 |
|---|---|---|---|---|---|
| Desulfurization, percent weight | 59.0 | 57.0 | 53.0 | 56.7 | 54.1 |

The desulfurization obtained with Catalyst B was

| Hours on Stream | 27 | 35 | 43 | 51 | 59 |
|---|---|---|---|---|---|
| Desulfurization, percent wt. | 75.0 | 60.0 | 43.3 | 44.6 | 39.7 |

Thus although Catalyst B (prepared with no fibres added) had a higher initial activity than Catalyst A (prepared with fibres added) its activity declined rapidly with use and after only 40 hours on stream Catalyst A was superior in activity. This difference in the rate of decline of catalyst activity is also reflected in the carbon contents of the catalysts after 60 hours on stream. With Catalyst A it was 5.6% wt., with Catalyst B it was 26.5% wt. Since for an economic process a hydrocatalytic desulfurization catalyst should have a long on-stream life before regeneration is necessary, the superiority of Catalyst A is clearly evident.

We claim:
1. A process for preparing a refractory oxide catalyst support having an interlacing network of pores comprising incorporating water-insoluble organic fibres having a ratio of length to width of at least 3 into and throughout a catalyst support during its preparation, and thereafter removing the fibres from the formed support, to produce a catalyst support having an interlacing network of pores throughout.

2. A process as claimed in claim 1 wherein the refractory oxide is an oxide of an element selected from Groups II, III and IV of the Periodic Table.

3. A process as claimed in claim 2 wherein the refractory oxide contains more than 50% wt. of a refractory oxide selected from the class consisting of alumina, silica, and mixtures of silica and alumina.

4. A process as claimed in claim 1, wherein the fibres are removed by combustion during calcination at temperatures of from 300 to 1200° C.

5. A process as claimed in claim 1 wherein the fibres are cellulose fibres.

6. A process as claimed in claim 1 wherein the fibres are from 10 to 100 microns diameter.

7. A process as claimed in claim 1 wherein the fibres are from ¼ to 1/250 inch long.

8. A process as claimed in claim 1 wherein the amount of fibres added is from 2 to 30% wt. by weight of the final catalyst support.

9. A process as claimed in claim 1 wherein there is added to the catalyst support from 0.1 to 25% wt. by weight of total catalyst of catalytic material which is selected from the class of elements having hydrogenating/dehydrogenating activity in Groups VIa and VIII of the Periodic Table.

References Cited in the file of this patent
UNITED STATES PATENTS

| | | |
|---|---|---|
| 2,603,610 | Amos et al. | July 15, 1952 |
| 2,769,760 | Annable et al. | Nov. 6, 1956 |
| 2,844,517 | Inwood | July 22, 1958 |